April 22, 1969  D. E. BAKER ET AL  3,440,085
METHOD OF AND APPARATUS FOR PRODUCING COATED PARTICLES
Filed Dec. 16, 1963
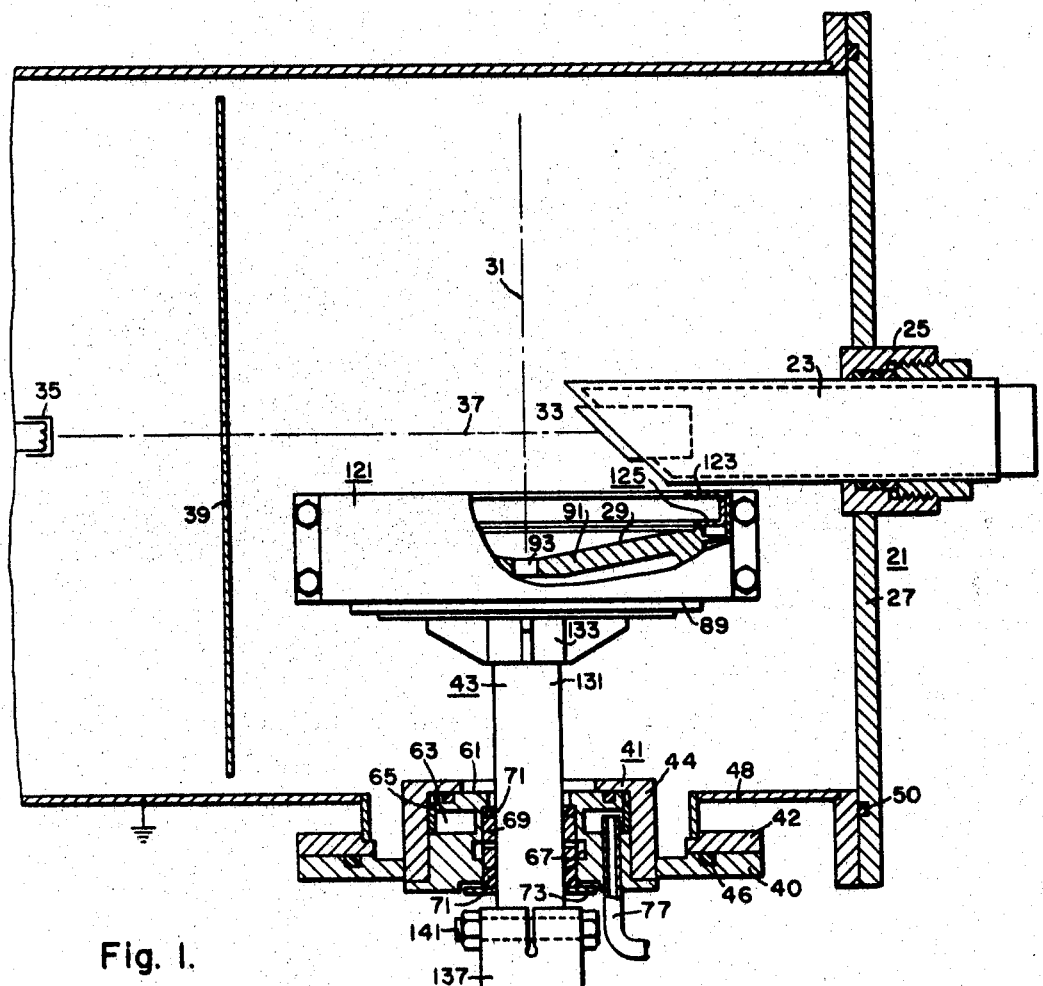
Fig. 1.
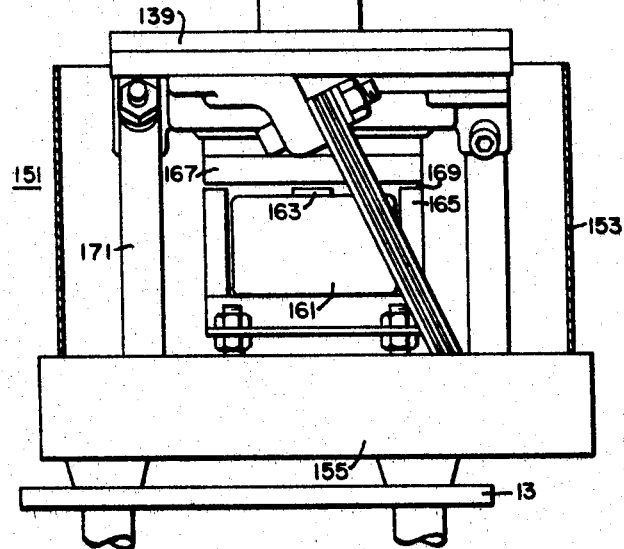

April 22, 1969     D. E. BAKER ET AL     3,440,085
METHOD OF AND APPARATUS FOR PRODUCING COATED PARTICLES
Filed Dec. 16, 1963

United States Patent Office 3,440,085
Patented Apr. 22, 1969

3,440,085
METHOD OF AND APPARATUS FOR PRODUCING COATED PARTICLES
Donald E. Baker, New Kensington, and John E. Eck, Apollo, Pa., assignors to Nuclear Materials and Equipment Corporation, Apollo, Pa., a corporation of Pennsylvania
Filed Dec. 16, 1963, Ser. No. 330,772
Int. Cl. C23c 13/02, 13/12
U.S. Cl. 117—100                    21 claims

ABSTRACT OF THE DISCLOSURE

Particles to be coated are subjected, on a surface 91 (FIG. 1), to a coating vapor emitted by a target 33 impinged by a high-power electron beam. The particles are recirculated between the surface 91 and a feed pan 89, on which they drop through a hole 93 in surface 91, by way of interlaced helices 90, 92, 94, 96 (FIG. 3). The advance of the particles is effected by drive 151 (FIG. 1) which imparts to the helices and surface 91 a periodic motion having the wave-form shown in FIG. 9. During the gradual forward rising parts of the motion the particles are advanced on the helices and along the surface 91. During the abrupt retracting parts of the motion the particles are suspended over the helices and surface 91.

---

This invention relates to the art of producing coated particles and has particular relationship to the coating of particles by condensation on their surfaces of the vapor of a vaporizable coating material. The particles with which this invention concerns itself may be metallic or ceramic, and generally may be of 10 mesh or finer. The coatings may also be metallic or ceramic. Typically particles of uranium and its oxides and carbides, aluminum and its oxides are coated in the practice of this invention. Typical coating materials are tantalum, tungsten, molybdenum, zirconium, aluminum, and their oxides.

It is broadly an object of this invention to produce uniformly coated particles.

In producing coated particles in accordance with the teachings of the prior art, the particles to be coated are subjected to the vapor for a predetermined time interval, adequate for coating, on the surface of a plate or member which is vibrated. After the interval the particles are removed from the surface. This mode of coating has not yielded satisfactory results. The coating condensed on the particles behaves as if it were tacky or sticky and the particles tend to agglomerate and stick to the surface.

It is an object of this invention to overcome the above-described difficulties of the prior-art apparatus.

It is another object of this invention to provide a method of, and apparatus for, producing coated particles in the practice and use of which the tendency of the particles to stick to the surface on which they are exposed to the coating vapor and to agglomerate shall be suppressed.

In accordance with an aspect of this invention the agglomeration and sticking of the particles is prevented by advancing the particles across the surface on which they are subjected to the vapor while periodically disengaging the particles from the surface. This object is accomplished by imparting to the surface a periodic motion which is abrupt at least during a portion of each period.

To provide the coating vapor the coating material is vaporized. The vaporization may take place in different ways, typical of which are induction or electrical resistance heating of the material to vaporization, or heating in an electric arc of which the material may be a consumable electrode or heating in an electric arc produced between a non-consumable electrode or by heating in a plasma jet.

One of the preferred ways of providing the coating vapor is to vaporize the coating material by electron-beam bombardment. In this case a high power electron-beam, for example of 30 kw., is projected onto a target of the coating material. The beam produces a source of vapor in the region of the material and this vapor is projected onto the surface where the particles are subjected to coating.

In attempting to coat with vapor produced by electron-beam bombardment or in other ways, which result in the producing substantially of a point source of vapor, difficulty has been experienced in producing particles with uniform coatings. It is an object of this invention to overcome these difficulties and to provide a method of, and apparatus for, producing uniformly coated particles where the coating vapor is derived by electron-beam bombardment or the like.

This aspect of this invention arises from the realization that the coating vapor is emitted from the target in generally linear streams. A particle injected in this stream is coated to a greater extent on the part of its surface on which the streams impinge and less on the part of the surface away from the stream.

In accordance with an aspect of this invention the particles are repeatedly injected into the vapor and passed through the vapor. The movement of the particles as they are injected into the vapor is random so that the particles are subjected to the vapor on each repetition at different attitudes with respect to the streams of vapor and are uniformly coated.

In the specific practice of this invention the particles are circulated by a helical conveyor which is subject to periodic driving movement. During each period of the movement the conveyor is rotated and retracted axially and thereafter is restored to its initial position. The rotation takes place at a predetermined rate relatively gradually, the restoration or return is at a high rate or abrupt so that under their inertia the particles remain in each advanced position. The particles are advanced further in steps during each succeeding period.

The motion in each direction impresses on the particles a combination of component forces. There is a tangential component along the helix and a component along the axis of the helix. In addition, centrifugal force by reason of the circumferential motion is impressed and this tends to move the particles towards the periphery of the system. The vertical components are such that when combined with the circumferential components they cause the particles to climb the inclined planes formed by the helix.

In accordance with an aspect of this invention the helical conveyor is made up of a plurality of interlaced helices which are disposed around the peripheries of a surface on which the particles are exposed to the vapor and a feeding surface. The exposure surface has an opening through which the particles are transferred to the feeding surface. The exposure surface thus serves as a return surface. The vapor is projected on the exposure surface. When the vapor is derived by electron-beam bombardment the target may be set adjacent the exposure surface so that the vapor streams towards this surface.

The helices are disposed with their axes vertically with the exposure or return surface at the top and the feed surface at the base. Each helix has a starting terminal at the periphery of the feed surface, in particle receiving relationship with this surface, and an end terminal at the periphery of the exposure or return surface, in particle-transfer relationship with this surface. The respective starting and end terminals are distributed around the respective peripheries of the surfaces so that the particles are received and transferred over substantially the whole of the surfaces.

To facilitate the transfer of the particles the exposure surface may be tapered in the form of a funnel from the ends of the helices towards the opening and the feed surface may be tapered in the form of a shallow cone, from the region where it receives the particles which fall through the opening to the starting terminals of the helices. Preferably the helices and the surfaces are combined into a single unit which is vibrated as disclosed above. It is important that the exposure surface is vibrated by this drive. The vibration imparts an aggitative or jumpy motion to the particles such that as they move along the exposure surface they periodically are separated from the exposure surface and do not adhere to this surface. The jumpy motion also prevents the particles from agglomerating.

In the typical practice of this invention with a typical embodiment of this invention about 50 cubic centimeters of particles of 10 mesh or smaller are coated uniformly by being moved repeatedly along a coating surface as described above. The surface is bathed in vapor from a target adjacent the surface a spot of which is vaporized by an electron-beam accelerated by a potential of 30 kv. The particles are exposed to the vapor every four seconds. Since a large proportion of this time is taken by the particles in moving up the helices it is estimated that the actual exposure time to the vapor is of the order of between .1 and 1.0 second.

The novel features considered characteristic of this invention are described generally above. For a better understanding of this invention, both as to its organization and as to its method of operation, together with addition objects and advantages thereof, reference is made to the following description taken in connection with the accompanying drawings, in which:

FIGURE 1 is a view partly in section and partly in side elevation showing a preferred embodiment of this invention with which the method according to this invention may be practiced;

Figure 2:
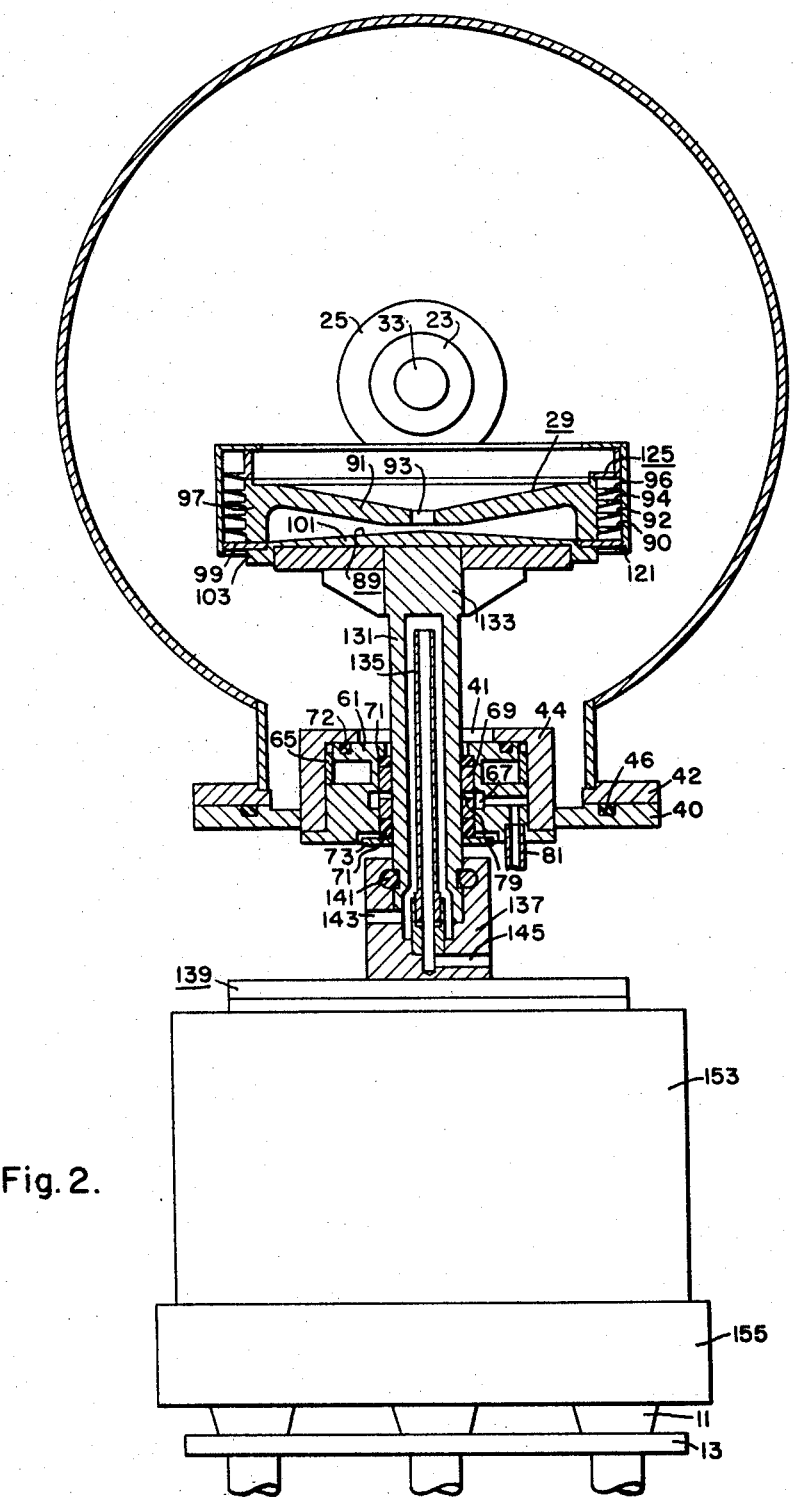
FIG. 2 is a view partly in end elevation and partly in section of this embodiment.

The apparatus shown in the drawings includes an Electron-Beam Vaporizer from which the coating vapor is derived, a Particle Conveyor for repeatedly passing the particles over a surface where they are subjected to the vapor, and a Drive for the Particle Conveyor. This apparatus is supported on shock mounts 11 of soft rubber which are resting on a rigid base 13.

The Electron-Beam Vaporizer includes a generally cylindrical chamber 21 which is maintained evacuated to a low pressure, less than 0.1 micron, by pumps (not shown) adequate to maintain the low pressure; typically diffusion pumps backed up by mechanical pumps are used. In the usual practice of this invention, the pumps are maintained in continuous operation when the apparatus is in use. The Vaporizer includes a target mounting bar or target mount 23 which extends through a demountable seal 25 in an end wall 27 of the chamber 21.

The end of the bar 23 within the chamber extends over the surface 91 of the return pan or funnel 29 of the Particle Conveyor over which the particles to be coated are advanced and is beveled so that it is at an angle of about 45° to the axis 31 of the return pan 29.

The target 33 which is composed of the vaporizable coating material is a cylindrical bar of the material. The beveled face of the target holder is provided with a groover having the form of the target in which the target is held by a wedge-shaped key (not shown). The target fits loosely in the groove since it expands substantially during the vaporization process. The target-holder 23, and through it, the target, are water cooled to limit the extent of melting of the target 33.

The Electron-Beam Vaporizer also includes a cathode 35 for producing electrons and the usual accelerating and focusing facilities (not shown) projecting a high-powered electron beam 37 on the target 33. The portion of the chamber 21 including the pan 29 and the target 33 are separated by a baffle 39 from the cathode 35 and the other beam generating components. The baffle 39 has a hole through which the beam 37 passes. The pumping equipment (not shown) is connected to the chamber 21 on the cathode side of the baffle 39. The electron-beam accelerating and focusing components are also in the cathode side of the baffle 39 so that on the target side of the baffle the beam 37 moves in a field-free space.

The beam 37 impinging on the target 33 produces a hot spot which serves as a source for the vapor. Because of the low pressure in the chamber 21 the mean-free-path for the vapor particles is high and the particles do not collide. The flow of the vapor from the target 33 is then in linear rays radiating from the hot spot in all directions over a solid angle of approximately 180°. A large proportion of these vapor rays impinge on the pan 29. The baffle 39 serves the double purpose of preventing the pumping equipment from evacuating the coating vapor and of protecting the cathode 35 and the electron-beam accelerating and focusing components, from the vapor. Between the baffle 39 and the target 33 the electron beam 37 flows in a field-free space.

The wall 27 of the chamber 21 is provided with a flange 40 which is bolted to a circular flange 42. The joint between the flange 40 and the flange 42 is sealed by an O-ring 46. The flange 42 is suspended from the cylindrical chamber wall 48 secured to wall 27 and sealed by O-ring 50. A ring 44 extends rigidly from the flange 40 and supports a seal 41 in which a shaft 43 of the Particle Conveyor is rotatable back and forth and slidable upwardly and downwardly.

The seal 41 includes a hollow cylindrical block 61 of a heat-conducting material such as brass. The block 61 has a large annular groove or slot 63 which is closed by a shell 65 and a smaller groove or slot 67 which extends around its inner periphery. The block 61 carries a spacer or bearing 69 of a material such as Teflon at the ends of which shaft seals 71 are provided. Suitable shaft seals 71 may be bought from Johns Manville Co. under the designation 6369 Type SS. Garlock seals are also suitable. The shaft 43 engages the bearing 69 and is sealed vacuum-tight by seals 71.

The block 61 and the bearing and shaft seal parts carried by it are securely bolted to the ring 44. The joint between the block 61 and clamping ring 44 is sealed by an O-ring 72. The lower shaft seal 71 is held by a retaining ring 73 bolted to block 61. The seal 41 is provided with inlet and outlet tubes 75 and 77 for conducting cooling fluid, usually water, through cavity 63. The groove 67 is connected to the junction between the shaft 43 and the bearing 69 by opening 79 in the bearing 69. The groove 67 is connected through a tube 81 with the vacuum pumps (not shown) and is maintained evacuated. While the pressure in the groove 67 may be higher than in the chamber 21, the vacuum in groove 67 prevents leakage through seal 41.

The Particle Conveyor includes the return pan 29, along which the particles to be coated flow as they are exposed to the vapor, and a conical feed pan 89. The feed pan 89 and the return pan 29 are interconnected by a plurality of interlaced helices 90, 92, 94, 96 which cooperate to circulate the particles to be coated.

The return pan 29 has a conical surface 91 on which the particles are exposed and an opening 93 through which the particles drop into the feed pan 89. Slots 95 are milled along the periphery of the surface to facilitate the movement of the particles from the periphery to the opening 93.

The return pan 29 extends integrally from a circularly cylindrical wall 97 in the external surface of which the helices 90, 92, 94, 96 are formed. The wall 97 carries a ring-shaped track 99 along which the helices 90 through 96 start. The feed pan 89 is a plate having a conical surface 101 convexed upwardly. At the center the surface communicates with the opening 93. The pan 89 carries a flange 103 which is secured to the cylindrical wall 97 together with the track 99.

Figure 4:
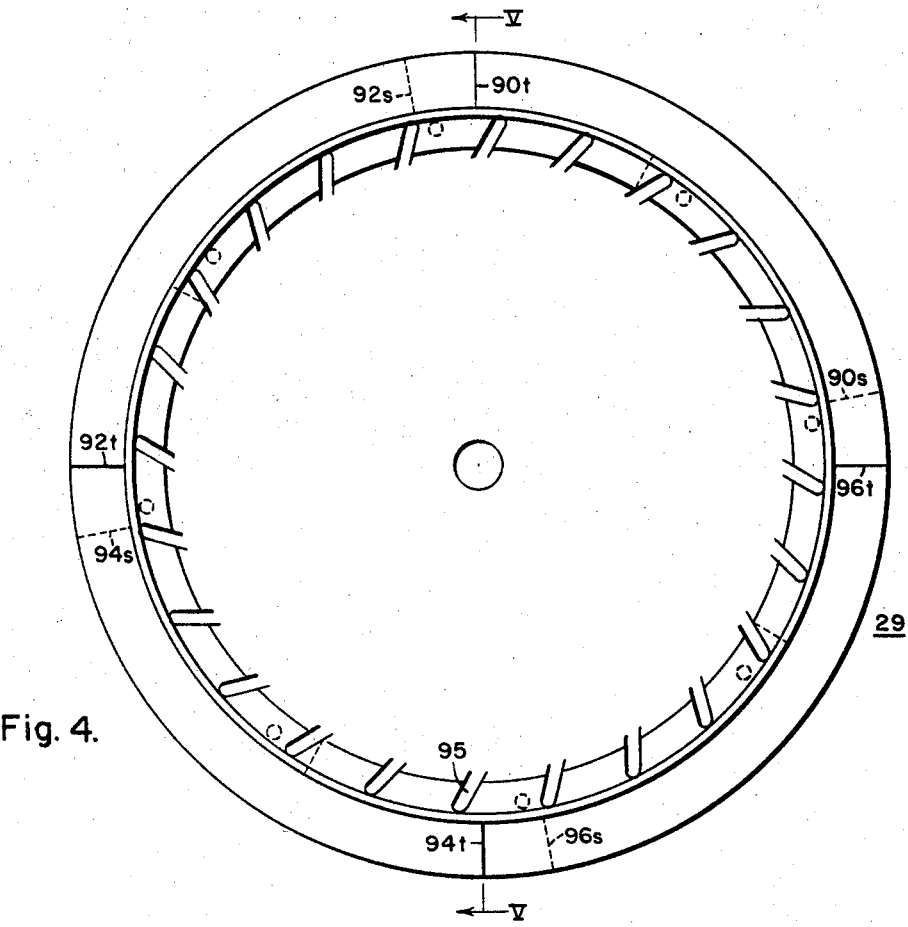
FIG. 4 is a view in top elevation of the member of this embodiment on which the particles are exposed to the vapor.
Figure 5:
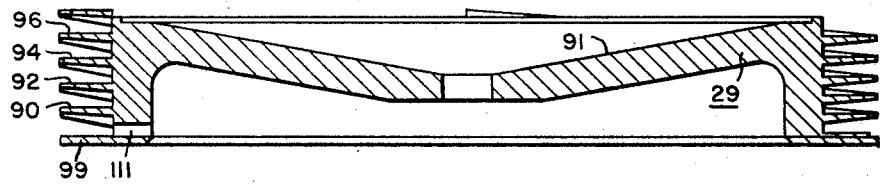
FIG. 5 is a view in section taken along line V—V of FIG. 4.

The helices 90 through 96 have starting edges 90s, 92s, 94s, 96s (FIG. 4) distributed at 90° intervals along the track 99. The helices 90 through 96 have terminating edges 90t, 92t, 94t, 96t distributed at 90° intervals along the periphery of the surface 91. A flat tapered strip 100 (FIG. 3 top) extends from each terminating edge 90t through 96t. The wall 97 has slots 111 through which the surface 101 (FIG. 5) of the feed pan 89 communicates with the starting edges 90s, 92s, 94s, 96s of the helices. Typically the helices have an inner diameter of 7 inches and an outer diameter of 8 inches; the helices have a ¼" pitch and a 1" lead.

Figure 3:
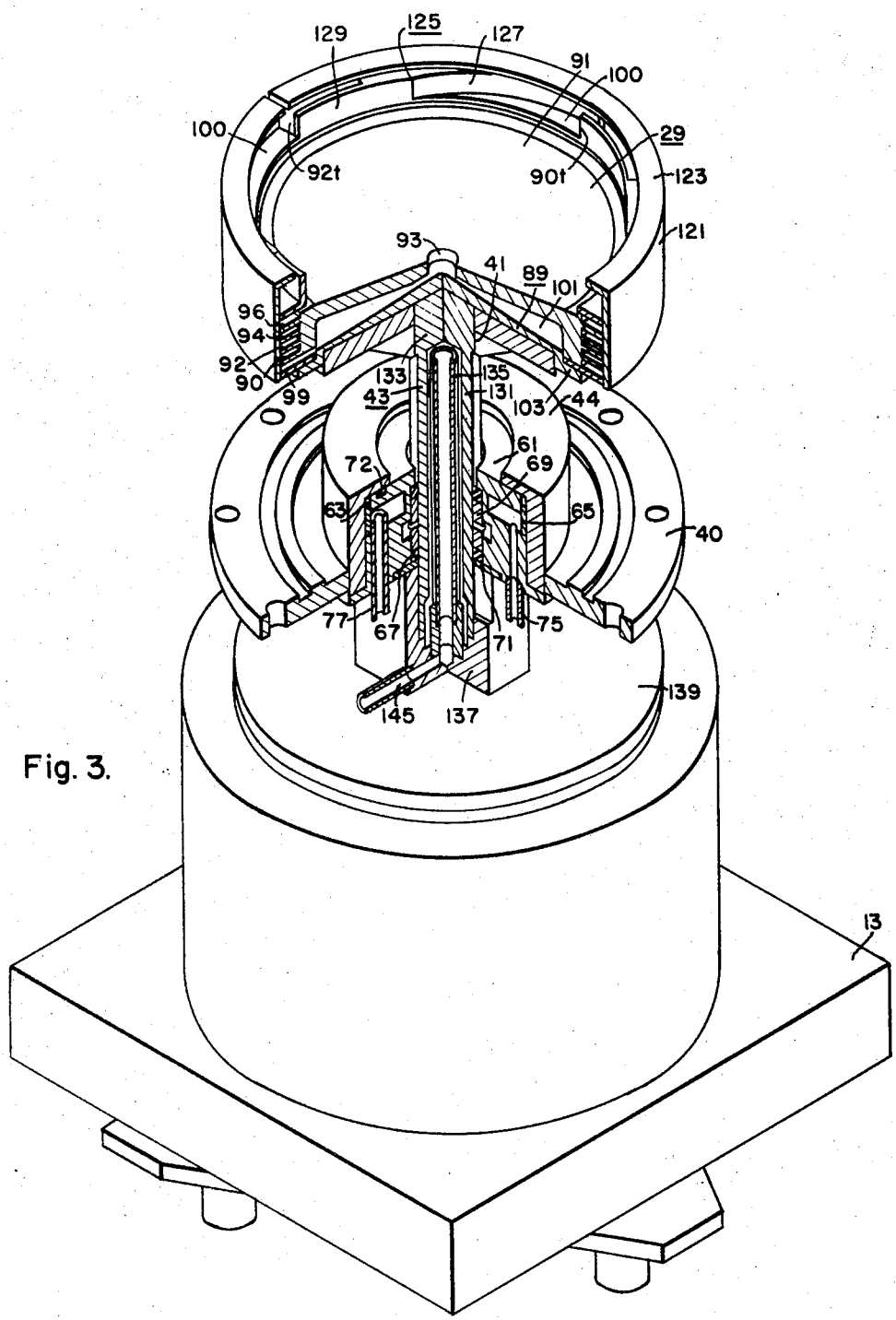
FIG. 3 is an exploded view in perspective showing this embodiment less the chamber in which the vapor is generated.
Figure 6:
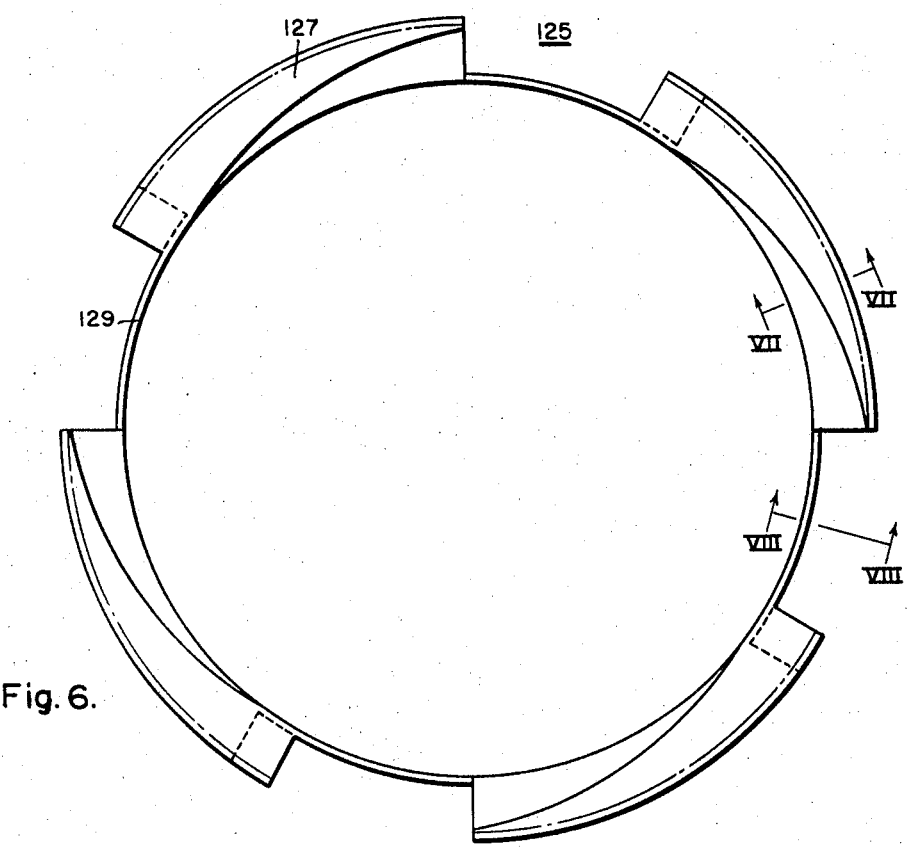
FIG. 6 is a view in top elevation showing the spreader plate of this embodiment against which the particles are projected from the helices at the particle-entrance of the exposure surface.
Figure 7:
FIG. 7 is a view in section taken along line VII—VII of FIG. 6.
Figure 8:
FIG. 8 is a view in section taken along line VIII—VIII of FIG. 6.

The assembly of the feed and return pans 29 and 89 and the helices 90 through 96 is enclosed in a shell or cover pan 121 having an overhang 123. The shell 121 is clamped around the helices. A spreader plate 125 (FIGS. 6 and 7) of generally annular form is secured between the overhang 123 and the terminating surfaces of the helices. This spreader plate 125 includes a plurality of strips 127 each having the form of a spiral arc, typically subtending an angle of about 60°, and each terminating in a circularly cylindrical strip 129, typically subtending an angle of about 30°. A spiral arc strip 127 bounds the external edge of each flat tapered strip 100 between each terminal edge 90t through 96t and the tip of the strip 100 (FIG. 3). Beyond this tip the cylindrical strip 129 extends. The cylindrical strip bounds the periphery of the return pan surface 91. The strips 127 and 129 project the particles to be coated over the surface 91 in the operation of the apparatus and prevent the particles from being ejected from the pan 29 or onto lower helical surfaces. The strips 127, because of their spiral form, in cooperation with the slots 95 in the surface 91 distribute the particles substantially uniformly over the surface 91 between the outer rim of the surface and the opening 93. As the particles are so uniformly distributed they are in constant motion and are uniformly coated and do not tend to agglomerate.

The Particle Conveyor also includes the shaft 43 (FIG. 3). This shaft 43 is made up of a hollow outside tube 131, having a solid tip 133 which is firmly secured to the base of the feed pan 89, and is thus rigidly connected to the pan-helix assembly 29–89–90–92–94–96. The shaft 43 also includes a central tube 135.

At its end remote from the feed-pan 89 the shaft 43 is secured to the Drive firmly by a split cylindrical coupling 137. The coupling is secured to the driven plate 139 of the Drive and is pinched on the outside tube 131 by bolts 141 (FIG. 2). The inner tube 135 is firmly secured by the coupling 137 and is projected into the tube 131 when the tube 131 is slipped into the coupling 137. The coupling 137 is provided with spaced lateral openings 143 and 145 which are in communication respectively with the inside of tube 131 and the inside of tube 135. Cooling fluid flows into opening 143, through tube 131, through tube 135, and out through opening 145. The drive plate 139 is connected through coupling 137 to shaft 43 in driving relationship with shaft 43 and thus the shaft drives the pan-helix assembly 29–89–90–92–94–96.

The Drive (FIG. 1) is typically of the type sold by Syntron Company of Homer City, Pa., as a Vertical-Vibratory Parts Feeder. A suitable Drive is sold by Syntron as Model EB–01C or Model EB–01 Type C.

The Drive includes an electro-magnet 151 mounted within a housing 153 on a base 155 secured to the shock mounts 11. The electro-magnet 151 includes a coil 161 in magnetizing relationship with a core 163 having pole faces 165. The Drive also includes an armature 167 carried by the drive plate 139 which armature is from the pole faces 165 by a narrow air gap 169. The drive plate 139 is connected to the base 155 through heavy leaf springs 171.

The Drive may be energized by alternate half-wave pulses of a commercial, 60 cycle alternating current source (not shown). Each half-wave magnetizes the core 163 so that the armature 167 is attracted to the core, and as it moves carrdies the drive plate 139, the shaft 43, and the pan assembly 29–89–90–92–94–96 with it. The leaf-springs 171 are distorted producing twisting movement so that the plate 139 and the parts connected to it not only moves towards the poles 165 of the armature 163 but also turns or twists. Between pulses the springs 171 restore the armature 167, plate 139 and the parts secured to the plate 139 to the initial position. The springs 171 cause the helices 90, 92, 94, 96 to move or turn upwardly during the restoring interval and the electro-magnet causes the helices to move downwardly.

Figure 9:
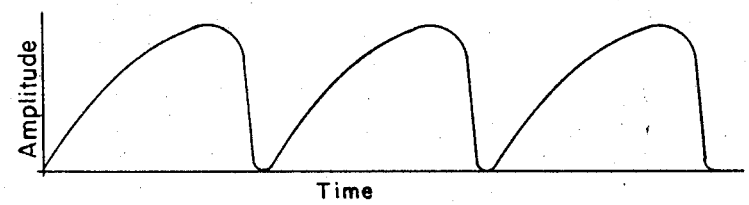
FIG. 9 is a graph illustrating the wave-form of the impulses which drive the helices.

The movement has approximately the wave-form shown in FIG. 9 in which amplitude is plotted vertically and time horizontally. The movement downwardly is abrupt while the movement upwardly is gradual. The gradual movement raises the particles to be coated from the feed pan 89 towards the return pan 29. The abrupt downward movement leaves the particles in their raised position. For effective operation the system consisting of the masses of the armature, plate 139, and pan-assembly and base plate 155 and the springs 171 must be tuned to approximate resonance.

In the use of the apparatus the target 33 is keyed to the holder 23 and the particles to be coated are deposited on the surface 91 from which they drop on the surface 101. The Drive and Particle Conveyor are then mounted so that the Particle Conveyor extends vacuum tight into chamber 21. The chamber 21 is then evacuated to a pressure less than .01 micron and the electron beam is produced and projected onto the target 33 and at the same time the Drive is energized. A stream of vaporized coating material is emitted from the target 33 and projected towards the surface 91. As the Drive operates the particles repeatedly flow from the surface 101, through the opening 11, up the helices 90 through 96 and over the surface 91 and the coating vapor impinges on them. The particles are projected at random onto the surface 91 and are during each exposure at a different attitude with respect to the vapor stream. The particles are thus uniformly coated.

Typically particles may be circulated for an interval of a few minutes, to produce a thin coating of the order of 1 micron or less and for several hours to produce a coating of the order of .001 inch. In coating for an interval of 5 minutes the particles would be exposed seventy-five times in the typical practice of this invention.

We claim as our invention:
1. The method of producing uniformly coated particles with a vaporizable coating material which comprises imparting to a member having surfaces on which the particles are advanced and exposed to coating a periodic motion, the wave-form of said motion being made up of waves each of which includes an advancing component during which said surfaces are advanced from a first position at a predetermined rate and a resetting component during which said surfaces are reset to said first position at a rate high compared to said predetermined rate, said particles to be coated being advanced during said advancing component and said particles to be coated being disengaged from said surfaces during said resetting component, vaporizing said materials adjacent certain of said surfaces, and projecting the vapor of said material in substantially linear streams on said particles while said motion is imparted to them to coat said particles with a uniform coating of said vapor as they are advanced.

2. The method of claim 1 wherein the wave-form of the motion is such as to agitate the particles while they are advanced and change the attitudes of the particles with respect to the vapor.

3. The method of claim 1 wherein the particles are recirculated around the surfaces so that they are repeatedly subjected to coating by the vapor at different attitudes.

4. The method of producing uniform coated particles with a vaporizable coating material comprising, producing a vapor of said material, projecting said vapor in substantially linear trajectories, moving the particles to be coated along a surface through the trajectories of said vapor by imparting to said particles to be coated a periodically advancing motion, the wave-form of said motion being at least in part abrupt as shown in FIG. 9 hereof, so that said particles to be coated are advanced over said surface and periodically, during the abrupt wave-form part of said motion, are disengaged from said surface and do not adhere to said surface, said particles being coated by impingement of said vapor with a uniform coating.

5. The method of producing uniformly coated particles with a vaporizable coating material comprising producing a vapor of said material adjacent a surface, projecting said vapor as a linear stream on said surface so as to bathe said surface in said vapor, and circulating the particles to be coated repeatedly through said vapor over said surface by imparting to said particles to be coated a periodic advancing motion, the wave-form of said motion being at least in part abrupt as shown in FIG. 9 hereof, so that said particles to be coated periodically pass over said surface, under the action of said abrupt wave-form part of said motion, exposed to said vapor at different attitudes, to produce a uniform coating on said particles.

6. The method of producing coated particles with a vaporizable coating material which comprises producing a vapor of said material and recycling said particles through said vapor repeatedly injecting and reinjecting the same of said particles into said vapor, said particles being injected into said vapor substantially at random at the start of each injection so that each particle is at a different attitude with respect to said vapor during different injection.

7. The method of producing coated particles with a vaporizable coating material which comprises projecting vapor of said material along substantially linear paths into a coating region, and repeatedly injecting and reinjecting the same of said particles into said vapor a plurality of times, said particles being injected into said vapor substantially at random at the start of each injection so that each particle is at a different attitude with respect to said vapor during different injection.

8. The method of producing coated particles with a vaporizable coating material which comprises vaporizing a small region of said material to produce substantially a point source of said vapor from which said vapor is projected along diverging linear paths into a coating region, and repeatedly injecting and reinjecting the same of said particles into said region a plurality of times, said particles being injected into said region substantially at random at the start of each injection so that each particle is at a different attitude with respect to said linear paths during different injection.

9. Apparatus for producing uniformly coated particles with a vaporizable coating material comprising a member including a surface on which said particles are disposed, said member including particle-entrance means for injecting particles on said surface and particle-exit means for deriving particles from said surface, a target of said material disposed adjacent said surface with said surface in vapor receiving relationship with respect to said target, means for projecting a beam of charged particles on a region of said target to vaporize said region and project said vapor in linear streams on said surface, and means connected to said member for repeatedly moving the same particles across said surface between said entrance and exit means to subject said particles to the linear streams of said vapor in uniform coating receiving relationship.

10. Apparatus for producing coated particles with a vaporizable coating material comprising a member including a surface on which said particles are disposed, said member including particle-entrance means for injecting particles on said surface and particle-exit means for deriving particles from said surface, a target of said material disposed adjacent said surface with said surface in vapor receiving relationship with respect to said target, means for projecting a beam of charged particles on a region of said targets to vaporize said region and project said vapor on said surface, and means connected to said member for repeatedly moving the same particles across said surface between said entrance and exit means to subject said particles to said vapor in coating receiving relationship with said vapor, said transferring means including means for injecting said particles at randomm through said entrance means so that said particles are injected at different attitudes with respect to said vapor at the start of different of the repeated transfers.

11. Apparatus for producing uniformly coated particles with a vaporizable coating material comprising a member including a surface on which said particles are disposed, said member including particle-entrance means for injecting particles on said surface and particle-exit means for deriving particles from said surface, means for projecting linear streams of a vapor of said material on said surface, and means connected to said member for repeatedly moving the same particles across said surface between said entrance and exit means to subject said particles to said linear streams of vapor in uniform coating receiving relationship.

12. Apparatus for producing uniformly coated particles including a member on the surface of which the particles to be coated are disposed, means connected to said member for imparting periodic motion to said surface, the wave-form of each period of said motion including an advancing component for advancing said surface from a first position at a first predetermined speed and a resetting component during which said surface is reset to its first position at a second predetermined speed, said second speed being high compared to said first speed, said particles being advanced during said advancing component and said particles being disengaged from said surface during said resetting component, and means in vapor-interchange relationship with said surface for vaporizing said material to provide a vapor for coating said particles and for projecting said vapors in linear streams on said particles as they are advanced and disengaged from said surface to produce a uniform coating on said particles.

13. The apparatus of claim 12 including means connected to the member and to the motion-imparting means for repeatedly recirculating the particles over the surface by the action of said motion-imparting means to repeatedly subject the particles to the coating action of the vapor.

14. A particle conveyor including a plurality of interlaced vertical helices each having a first terminal at a lower-end region and a second terminal at an upper-end region, said helices having their said first terminal distributed around the periphery of said lower-end region at the lower end of said helices and having their said second terminal distributed around the periphery of said upper-end region at the upper end of said helices, means in said lower-end region for feeding particles into said first terminal of said helices, means in said upper-end region for deriving particles from said terminal of said helices, and drive means connected to said helices for actuating said helices to convey said particles from said first terminal of said helices to said second terminal of said helices along said interlaced helices.

15. The conveyor of claim 14 wherein the means for feeding particles is a particle-feeding receptacle and the means for deriving particles is a particle deriving receptacle, and wherein each receptacle has a periphery, the helices having their first terminal distributed around the periphery of the feeding receptacle in particle receiving relationship with said feeding receptacle and having the second terminal distributed around the periphery of the deriving receptacle in particle transmitting relationship with the deriving receptacle.

16. The conveyor of claim 14 wherein the means for feeding particles is a particle-feeding receptacle and the means for deriving particles is a particle deriving receptacle, and wherein each receptacle has a periphery, the helices having their first terminal substantially uniformly distributed around the periphery of the feeding receptacle in particle receiving relationship with said feeding receptacle and having their second terminal substantially uniformly distributed around the periphery of the deriving receptacle in particle transmitting relationship with the deriving receptacle.

17. Particle conveyor apparatus including a first member having an exit opening therein for particles and having a first surface along which particles are movable, a second member having a second surface in particle-receiving relationship with said opening, a plurality of interlaced helices connected to said second member and joining the peripheries of said surfaces, each helix having a starting terminal in particle-receiving relationship with said second surface and an end terminal in particle-transfer relationship with said first surface, said starting terminals being distributed around said second surface and said end terminals being distributed around said first surface, and means connected to said helices for imparting periodic motion to said helices to advance said particles from said second surface to said first surface along said helices.

18. The conveyor of claim 17 wherein the first surface tapers towards the opening and the second surface tapers towards the starting terminals of the helices.

19. Particle conveyor apparatus including a first member having an exit opening therein for particles and having a first surface along which particles are movable, a second member having a second surface in particle-receiving relationship with said opening, a plurality of interlaced helices connected to said second member and joining the peripheries of said surfaces, each helix having a starting terminal in particle-receiving relationship with said second surface and an end terminal in particle-transfer relationship with said first surface, said starting terminals being distributed around said second surface and said end terminals being distributed around said first surface, and means connected to said helices and to said members for imparting to said helices and to said members a periodic motion having a first component axial with respect to said helices and a component circumferential with respect to said helices, each period of said motion including a gradual portion during which said helices move from a first position so as to advance said particles from said first surface towards said second surface and an abrupt portion during which said helices return to said first position.

20. Particle conveyor apparatus including a first member having an exit opening therein for particles and having a first surface along which particles are movable, a second member having a second surface in particle-receiving relationship with said opening, a plurality of interlaced helices connected to said second member and joining the peripheries of said surfaces, each helix having a starting terminal in particle-receiving relationship with said second surface and an end terminal in particle-transfer relationship with said first surface, said starting terminals being distributed around said second surface and said end terminals being distributed around said first surface, and means connected to said helices and to said first member for imparting to said helices and to said first member a periodic motion having a first component axial with respect to said helices and a component circumferential with respect to said helices, each period of said motion including a gradual portion during which said helices move from a first position so as to advance said particles from said first surface towards said second surface and an abrupt portion during which said helices return to said first position.

21. A particle conveyor including a plurality of interlaced vertical helices each having a first terminal at a lower end and a second terminal at an upper end, said helices having their first terminal distributed around the periphery at the lower end of said helices and having said second terminal distributed around the periphery at the upper end of said helices, means for feeding particles into said first terminal of said helices, means for deriving particles from said second terminal of said helices, said deriving means including spreader means for distributing said particles substantially uniformly over the region between said second terminal of said helices, and drive means connected to said helices for actuating said helices to convey said particles from said first terminal of said helices to said second terminal of said helices along said interlaced helices.

References Cited

UNITED STATES PATENTS

| | | | |
|---|---|---|---|
| 2,387,243 | 10/1945 | Castor | 117—107.1 |
| 3,024,133 | 3/1962 | White | 118—324 X |
| 3,125,208 | 3/1964 | Secunda | 198—220 |
| 3,192,064 | 6/1965 | Cerych et al. | 117—107 X |
| 3,205,087 | 9/1965 | Allen | 117—107 X |
| 3,217,864 | 11/1965 | Allen et al. | 198—220 |
| 3,261,322 | 7/1966 | Becker et al. | 198—220 |
| 3,220,875 | 11/1965 | Queneau | 117—100 |

ALFRED L. LEAVITT, Primary Examiner.

A. GOLIAN, Assistant Examiner.

U.S. Cl. X.R.

117—106, 107.1; 118—49.5; 198—220; 222—415

U.S. DEPARTMENT OF COMMERCE
PATENT OFFICE
Washington, D.C. 20231

UNITED STATES PATENT OFFICE
CERTIFICATE OF CORRECTION

Patent No. 3,440,085                                                   April 22, 1969

Donald E. Baker et al.

It is certified that error appears in the above identified patent and that said Letters Patent are hereby corrected as shown below:

In the heading to the printed specification, lines 4 and 5, "Donald E. Baker, New Kensington, and John E. Eck, Apollo, Pa.," should read -- Donald E. Baker, New Kensington, John E. Eck, Apollo, Thomas E. Haley, Pittsburgh, and Benedict L. Vondra, Jr., Greensburg, Pa., --.

Signed and sealed this 7th day of April 1970.

(SEAL)
Attest:

Edward M. Fletcher, Jr.                               WILLIAM E. SCHUYLER, JR
Attesting Officer                                                  Commissioner of Patents